US008285507B2

(12) United States Patent
Matsuba

(10) Patent No.: US 8,285,507 B2
(45) Date of Patent: Oct. 9, 2012

(54) MEASUREMENT UNIT, TRANSPORTATION SYSTEM, AND MEASUREMENT METHOD

(75) Inventor: Katsumi Matsuba, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 323 days.

(21) Appl. No.: 12/760,617

(22) Filed: Apr. 15, 2010

(65) Prior Publication Data
US 2010/0274513 A1 Oct. 28, 2010

(30) Foreign Application Priority Data

Apr. 24, 2009 (JP) ................................. 2009-106585

(51) Int. Cl.
*G06F 19/00* (2011.01)
(52) U.S. Cl. ....... 702/89; 702/184; 702/183; 340/572.1; 340/539.26; 73/891; 73/19.04; 73/1.16; 705/59
(58) Field of Classification Search ................... 702/89, 702/184, 81, 187; 340/572, 539, 988, 991, 340/992, 539.1, 539.26, 10.1, 10.4, 870.28, 340/429; 705/28, 59; 73/861, 19.04, 1.16, 73/1.25, 40.5 R
See application file for complete search history.

(56) References Cited

U.S. PATENT DOCUMENTS

| 5,835,012 | A  | * | 11/1998 | Wilk ........................ 340/539.26 |
| 7,149,658 | B2 | * | 12/2006 | Kadaba .......................... 702/184 |
| 7,324,921 | B2 | * | 1/2008  | Sugahara et al. ............. 702/183 |
| 7,902,492 | B2 | * | 3/2011  | Matsuba ........................ 250/216 |
| 7,918,122 | B2 | * | 4/2011  | Murata et al. .................. 73/1.16 |
| 8,088,203 | B2 | * | 1/2012  | Matsuba ......................... 96/417 |
| 2004/0056767 | A1 |   | 3/2004  | Porter |
| 2006/0157533 | A1 | * | 7/2006  | Onoue et al. ....................... 228/8 |
| 2006/0208881 | A1 | * | 9/2006  | Suzuki ..................... 340/539.27 |
| 2008/0147306 | A1 | * | 6/2008  | Hayashi ......................... 701/117 |
| 2008/0156069 | A1 | * | 7/2008  | Murata et al. ................ 73/19.04 |
| 2008/0294562 | A1 | * | 11/2008 | Kasahara et al. .............. 705/59 |
| 2009/0241684 | A1 | * | 10/2009 | Matsuba ......................... 73/861 |

FOREIGN PATENT DOCUMENTS

| JP | 2002-188992 A | 7/2002 |
| JP | 2006-194495 A | 7/2006 |
| JP | 2006-240809 A | 9/2006 |
| JP | 4186123 B2 | 11/2008 |
| WO | 2007/126193 A1 | 11/2007 |

OTHER PUBLICATIONS

Official Communication issued in corresponding Japanese Patent Application No. 2009-106585, mailed on Dec. 9, 2010.

* cited by examiner

Primary Examiner — Carol Tsai

(74) Attorney, Agent, or Firm — Keating & Bennett, LLP

(57) ABSTRACT

An environment sensor is mounted in a measurement unit. The measurement unit is adapted to be transported by a transportation apparatus. Measurement data from the environmental sensor is stored in a data format suitable for associating the measurement data with a state of the measurement unit.

3 Claims, 6 Drawing Sheets

MEASUREMENT UNIT, TRANSPORTATION SYSTEM, AND MEASUREMENT METHOD

BACKGROUND OF THE INVENTION

1. Field of the Invention

The present invention relates to a measurement unit, a transportation system, and a measurement method. In particular, the present invention relates to a technique of enabling data measured by the measurement unit to be analyzed even if an environment of the measurement unit, i.e., a state in which the measurement unit is placed, is not clear at the time of measurement.

2. Description of the Related Art

It has been proposed to transport a measurement unit equipped with sensors such as a particle sensor and a vibration sensor by a transportation apparatus such as a stacker crane to obtain environmental data during transportation and during storage in a rack or the like (See, for example, JP4168123B). According to JP4168123B, the measurement unit outputs measurement data to a transportation apparatus such as a stacker crane. In the transportation apparatus, data such as a state of the measurement unit is added to the measurement data, and the resulting data is outputted to a system controller. However, if the transportation apparatus does not have any communication device with the measurement unit, since the measurement unit cannot obtain data indicating the state, e.g., data indicating whether the measurement unit is being transported or the measurement data is stored, these items of data cannot be added to the measurement data. Therefore, the measurement data cannot be analyzed on the ground. Thus, in the transportation apparatus that does not have any device for communicating with the measurement unit, measurement of the environment using the measuring unit cannot be performed.

SUMMARY OF THE INVENTION

According to a preferred embodiment of the present invention, it is possible to add state data of a measuring unit to measurement data even if a transportation apparatus that does not have any device for communicating with the measurement unit is used to transport the measurement unit to measure environmental data.

According to another preferred embodiment of the present invention, it is possible to collect measurement data from a measurement unit even if no communication route, such as a wireless LAN, is available to the measurement unit.

According to a preferred embodiment of the present invention, a measuring unit adapted to be transported by a transportation apparatus includes an environment sensor, and a memory arranged to store measurement data from the environment sensor. The memory is adapted to associate the measurement data with a state of the measurement unit. For example, measurement data is associated with state data of the measurement unit obtained from the transportation apparatus or the like using time data or the like. Any method can be used for associating these items of data with each other.

In a preferred embodiment of the present invention, the state data of the measurement unit can be associated with the measurement data. Therefore, it is not necessary to include the state data of the measurement unit in the measurement data itself. Thus, even if data is obtained by measurement in a situation where communication with the transportation apparatus cannot be made, based on an operation of the transportation apparatus or the like, afterward, it is possible to analyze in what situation measurement was performed to obtain the data.

Preferably, the memory is adapted to associate the measurement data with the state of the measurement unit by storing the measurement data and time data together. In this manner, the measurement data can be associated with the state of the measurement unit using the time data easily.

Preferably, the memory is an electronic storage medium arranged to have the measurement data written in the storage medium, such as a USB memory, or a compact flash (registered trademark) memory, and the measurement unit preferably includes a terminal arranged to write data in these types of the storage medium. In this structure, the measurement data can be inputted to the controller through the electronic storage medium. Even if a transportation system that does not have any wireless LAN to connect the measurement unit and the controller is used, the data of the measurement unit can be analyzed.

Further, preferably, the measurement unit preferably further includes a timer, and a receiving unit arranged to receive a time signal to calibrate time data of the timer. The measurement and the time data are stored together so as to enable the measurement data to be associated with the state of the measurement unit. In this structure, using the calibrated time data received from the timer, the measurement data can be associated with the state data of the measurement unit easily.

In particular, preferably, the environment sensor at least includes a particle counter arranged to count a number of particles, a vibration sensor, a wind speed sensor, and a microphone. The measurement unit preferably further includes a low-pass filter arranged to process an output from the vibration sensor, and a controller arranged and programmed to identify whether the measurement unit is being transported or the measurement unit is stopped, based on a signal from the low-pass filter, to shorten a measurement interval when the measurement unit is being transported, and to extend the measurement interval when the measurement unit is stopped. In the structure, the measurement interval can be changed by determining whether the measurement unit is being transported, or the measurement unit is stopped by the vibration sensor. Further, vibrations and noises in the surrounding environment can be associated with each other using the microphone to enable the cause of the vibrations to be analyzed easily. The flow and cleanness of the air can be measured using the particle counter and the wind speed sensor.

Further, according to a preferred embodiment of the present invention, a transportation system includes a transportation apparatus, a measurement unit, and a controller. The measurement unit is adapted to be transported by the transportation apparatus, and the measuring unit includes an environment sensor. The measurement unit stores measurement data from the environment sensor and time data together. The controller stores state data of the measurement unit transported by the transportation apparatus and time data together, and associates the measurement data with the state data using the time data. Preferably, the state data includes a type of an event experienced by the measurement unit, and a position where the event occurred.

In the transportation system according to a preferred embodiment of the present invention, the measurement unit is transported by the transportation apparatus, and the measurement data and time data are inputted to the controller. Further, the state data of the transportation apparatus and time data are stored, and based on the time data, the measurement data is associated with the state data. In this manner, the measurement data can be associated with the state of the measurement unit without requiring communication between the measurement unit and the transportation apparatus.

Further, a method of measuring an environment around a transportation system according to another preferred embodiment of the present invention includes the steps of transporting a measurement unit including an environment sensor, a memory, and a timer, storing measurement data from the environment sensor and time data from the timer together in the memory, reporting a state of the measurement unit and the time data, from the transportation apparatus to a controller, inputting data in the memory to the controller, and associating the measurement data with data of the state using time data by the controller.

In the present specification, description regarding the measurement unit and the transportation system is directly applicable to the method of measuring an environment around the transportation system, and conversely, description regarding the method of measuring an environment around the transportation system is directly applicable to the measurement unit and the transportation system.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments that are most preferred will be described. The preferred embodiments can be modified suitably with reference to techniques known in this technical field. Therefore, the preferred embodiments should not be construed as limiting the scope of the present invention.

Figure 1:
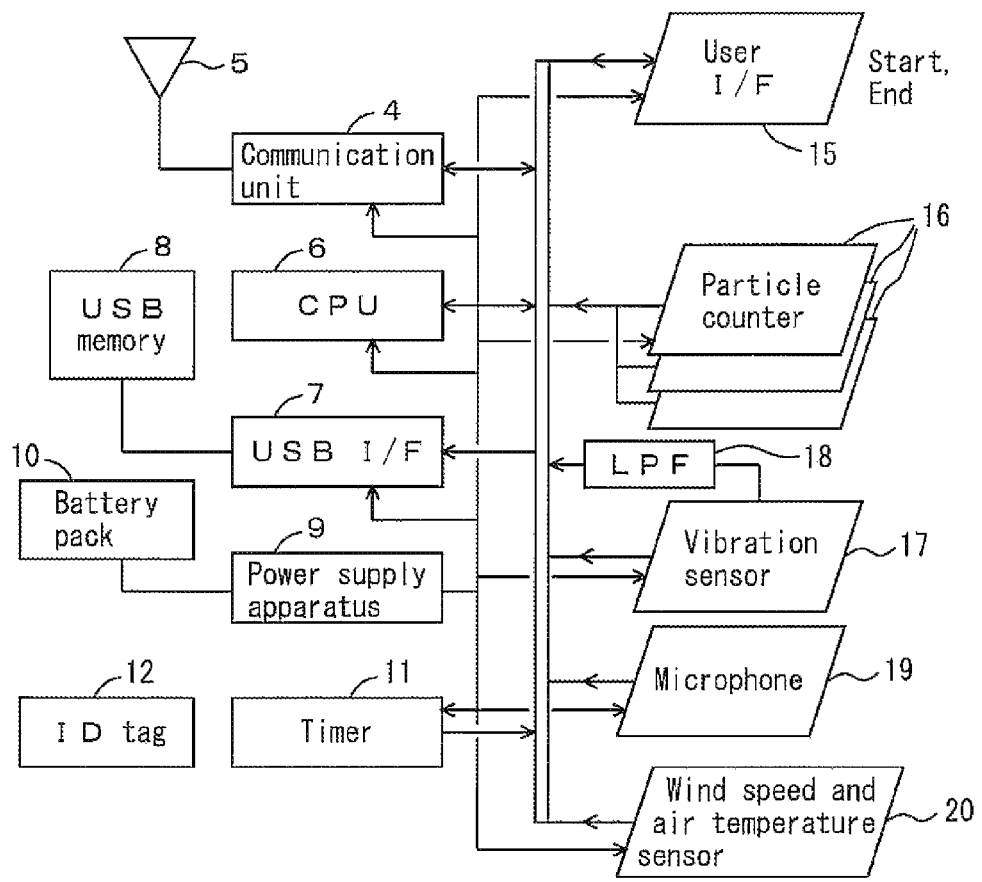
FIG. 1 is a block diagram showing a measurement unit according to a preferred embodiment of the present invention.

FIGS. 1 to 8 show a preferred embodiment of the present invention. FIG. 1 shows a measurement unit 2, and a reference numeral 4 denotes a communication unit arranged to provide wireless communication with a wireless LAN described later through an antenna 5. A reference numeral 6 denotes a CPU (Central Processing Unit) arranged and programmed to process data in the measurement unit 2. A reference numeral 7 denotes a USB interface arranged to read data from and write data to a USB memory 8. The measurement data obtained from measurement by the measurement unit 2 and time data are written in the USB memory 8. Additionally, measurement instructions may be read from the USB memory 8. The measurement instruction preferably includes a time range for performing a measurement, a type of measurement data, data indicating, e.g., whether all of environment sensors should be used for measurement or only designated sensors should be used for measurement, and in the case where only designated sensors should be used, data indicating which sensors should be used. Further, the measurement instruction preferably includes time intervals for writing measurement data in the USB memory 8. As described above, the measurement instruction is also considered as a designation of measurement conditions. In an environment where the wireless LAN is available, instead of writing output data in the USB memory 8, the output data may be outputted from the antenna 5 to the wireless LAN. Further, the measurement instruction may be received through the antenna 5. Alternatively, the measurement data may be inputted from a user interface 15. A reference numeral 9 denotes a power supply apparatus. Using electricity supplied from a battery pack 10, components of the measurement unit 2 are operated. A reference numeral 11 denotes a timer. The time of the timer 11 is calibrated using time stamp data obtained from the antenna 5. By counting the elapsed time after calibration of the time, the time at each time point is determined, and the time data and the measurement data are outputted to the USB memory 8 or the antenna 5. A reference numeral 12 denotes an ID tag such as a barcode label or an RF tag, for example.

A reference numeral 15 denotes the user interface. For example, the user interface 15 may preferably include a touch panel, or a combination of LEDs and input switches. Data instructing to start measurement, data indicating items to be measured, and data instructing to end measurement are preferably inputted via the user interface 15. Alternatively, or in addition to these items of data, the measurement instruction or the like is preferably inputted via the user interface 15. Further, the user interface 15 preferably displays whether the measurement unit 2 is in the middle of measuring or waiting, and displays a state of charge (amount of remaining electrical energy) or the like of the battery. The particle counter 16 counts the number of particles in the air flow passing through the measuring unit 2 to determine the density of the particles. A vibration sensor 17 is an acceleration sensor arranged to detect vibrations applied to the measurement unit 2. A low-pass filter 18 extracts a low frequency signal from the vibration sensor 17. Since the low frequency signal from the vibration sensor 17 corresponds to acceleration of the measurement unit 2 during transportation of the measurement unit 2, it is possible to determine whether the measurement unit 2 is stopped or being transported.

A microphone 19 detects ambient noises or the like. The microphone 19 provides auxiliary data, e.g., indicating the presence of, for example, high frequency noises, sudden large noises, low frequency noises, or the absence of noises in the surrounding environment, for use in the analysis of vibrations detected by the vibration sensor 17 for allowing the cause of vibrations to be analyzed easily. A wind speed and air temperature sensor 20 detects the wind speed and the air temperature of the air flowing through the measurement unit 2. Preferably, the wind speed is data preferably including an absolute value of the wind speed and an orientation of the wind (air flow). For example, the wind speed and distribution of the clean air in a clean room are preferably measured. The air temperature may not be measured, for example. In a state where the measuring unit 2 is placed in a rack or the like, the wind speed and air temperature sensor 20 preferably measures the speed and orientation of the travel wind that blows when the transportation apparatus passes thorough an area in the vicinity of the measurement unit 2. The particle counter 16, the vibration sensor 17, the low-pass filter 18 and the wind speed and air temperature sensor 20 are known in the art. Further, any types of sensors may be mounted in the measuring unit 2.

Figure 2:
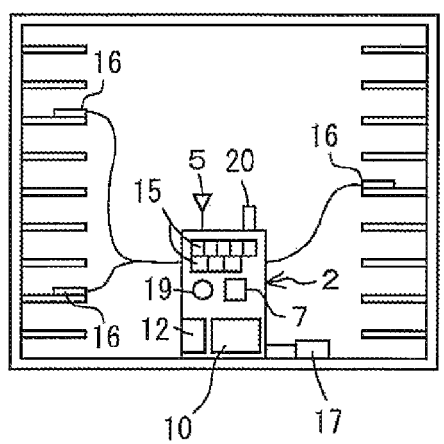
FIG. 2 is a front view showing a cassette containing the measurement unit according to a preferred embodiment of the present invention.

FIG. 2 shows a cassette 22 containing the measurement unit 2. For example, the cassette 22 is preferably used for transportation of FPDs (flat panel displays), for example. Alternatively, an FOUP for transportation of semiconductor substrate may be used as the cassette. In the case where the FOUP is used as the cassette, the cassette preferably has a skeleton shape only having frames so that the wind can freely flow through six surfaces of the cassette. Alternatively, instead of using the cassette, the measurement unit 2 may be mounted in a carrier used in the transportation system, such as a bucket or a palette. The cassette 22 is preferably made of skeleton frames, and the air can freely flow through the surrounding six surfaces. For example, from the front side of the cassette 22, the user can replace the battery pack 10, detach or attach the USB memory 8, and operate the user interface 15. Further, the cassette 22 may be transported by an overhead traveling vehicle in FIG. 3, an automated transportation vehicle, a conveyor, or a stacker crane.

Figure 3:
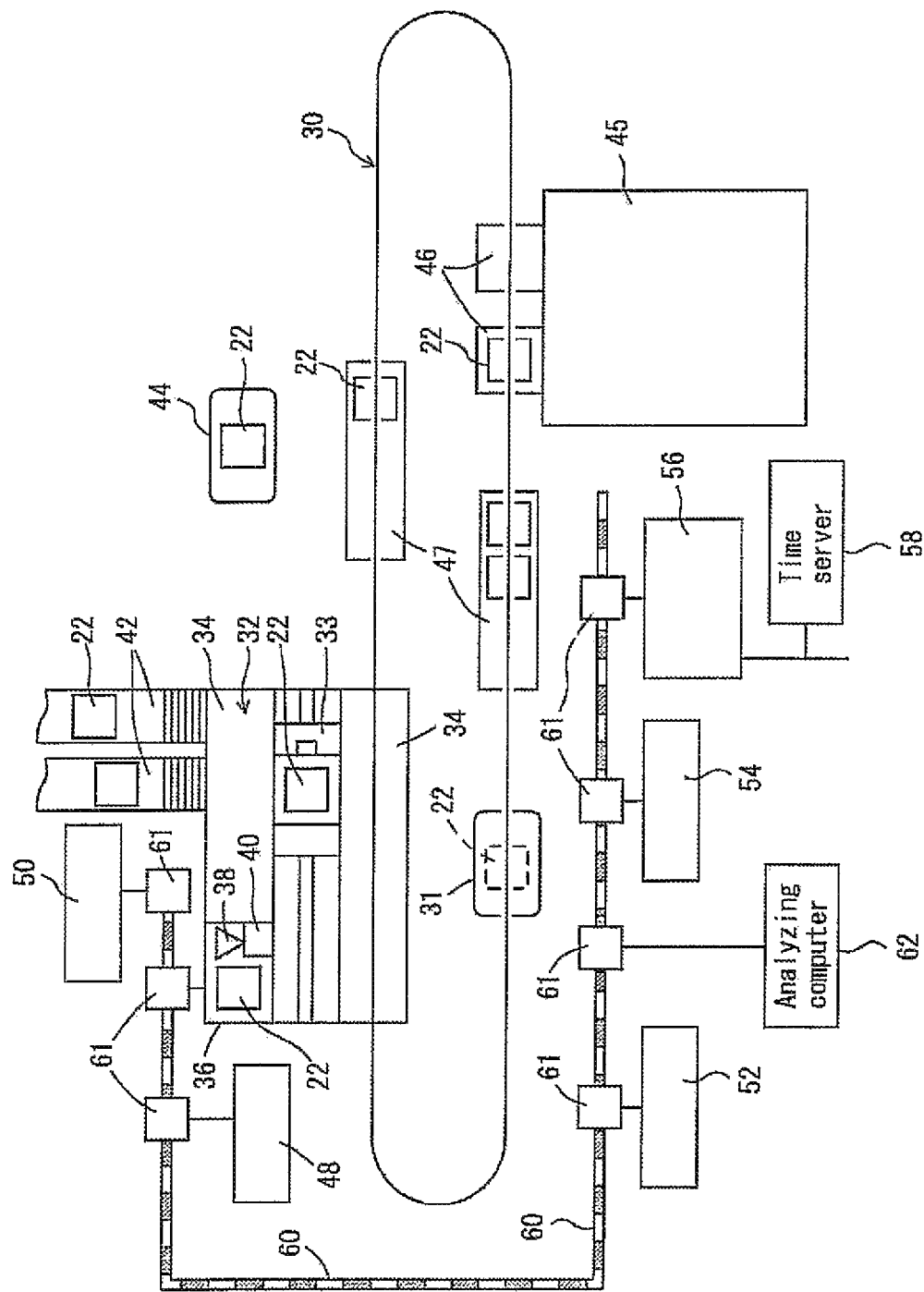
FIG. 3 is a diagram showing an example of a transportation system for obtaining environmental data according to a preferred embodiment of the present invention.

FIG. 3 shows an example of a layout of the transportation system as a target for measurement of environmental data. A reference numeral 30 denotes an overhead traveling vehicle system. In the overhead traveling vehicle system 30, a plurality of overhead traveling vehicles 31 circulate around a travel rail provided in the vicinity of a ceiling in a clean room, for example. A reference numeral 32 denotes a stocker. For example, a stacker crane 33 travels between a pair of left and right racks 34 to retrieve, and store the cassette 22. The stocker 32 preferably includes an MGV (Manual Guided Vehicle) port 36 arranged to retrieve and store the cassette by an MGV. In the MGV port 36, for example, an operator carries out replacement of the battery pack 10, detachment or attachment of the USB memory 8, and operation of the user interface 15. The MGV port 36 may be provided with an antenna 38 as a ground station of the wireless LAN and the USB interface 40 to allow wireless communication with the measurement unit 2, and to read data from and write data to the USB memory 8.

A reference numeral 42 denotes conveyors, a reference numeral 44 denotes an automated transportation vehicle that travels on the ground, and a reference numeral 45 denotes processing equipment such as an FPD. For example, the cassette is transferred to or from the overhead traveling vehicle system through a load port 46. A reference numeral 47 denotes buffers arranged to temporarily store cassettes.

A controller of the transportation system will be described. A reference numeral 48 denotes a stocker controller arranged and programmed to perform inventory control in the stocker 32, control of the stacker crane 33, and retrieval and storage of a cassette containing a measuring unit 2 and other cassettes from and into the MGV port 36. A reference numeral 50 denotes a conveyor controller arranged and programmed to control the conveyors 42. An automated transportation vehicle controller controls the automated transportation vehicle 44, and an overhead traveling vehicle controller 54 controls the overhead traveling vehicle system 30 and the cassettes on the buffers 47. The controllers 48 to 54 are controlled by a system controller 56 that is arranged and programmed to control the entire transportation system. An analyzing computer 62 collates (associates) measurement data having time data obtained from the measurement unit 2 with data indicating the position and state of the measuring unit 2 having time data obtained from the controllers 48 to 56. The data indicating the position and state of the measurement unit 2 is added to the measurement data. For example, in the case where the measurement unit 2 is stored in the rack, the position of the measurement unit 2 is designated by a rack address, and the state of the measurement unit 2 is "during storage". Further, in the case where the measurement unit 2 is being transported by the overhead traveling vehicle 31, the state of the measurement unit 2 is "in the middle of loading", "in the middle of transportation", "in the middle of unloading" or the like. The position of the measurement unit 2 is a position in the middle of transportation of the measurement unit 2.

The analyzing computer 62 adds data indicating the position and state of the measurement unit 2 to the data from the measurement unit 2 using items of data supplied from the controllers 48 to 56, and analyses the environment of the transportation system based on the added data. The target of environmental analysis is the cleanness (particle density), the orientation and speed (wind speed) of the air flow, the degree of vibrations during transportation, the air temperature or the like. The measurement position can be any position such as a position on the transportation apparatus, a position in the rack 34, a position on the buffer 47, or a position on the load port 46. A time server 58 of the system controller 56 generates time stamp data as the reference time of the entire transportation system. The controllers 48 to 56 and the analyzing computer 62 are preferably connected to a LAN 60 through, e.g., hubs 61, and the transportation apparatuses such as the stacker crane 33 and the overhead traveling vehicle 31 receive time stamp data from the respective controllers. Instead of using the LAN 60, a ground station for the wireless LAN may be provided in each section of the transportation system to make it possible to perform wireless communication with any of the controllers 48 to 56 at an arbitrary position.

Figure 4:
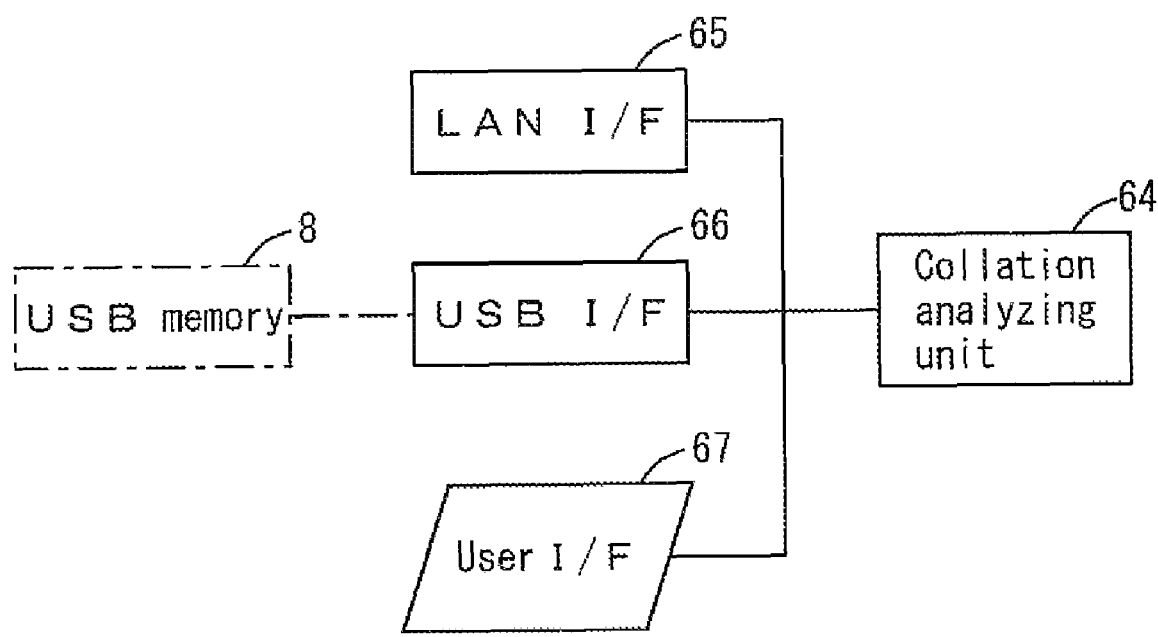
FIG. 4 is a block diagram showing an analyzing computer according to a preferred embodiment of the present invention.

FIG. 4 shows structure of the analyzing computer 62. A reference numeral 64 denotes a collation analyzing unit arranged to associate the measurement data of the measurement unit 2 having time data from the USB memory 8 with data indicating the position and state having time data from the controllers 48 to 56, and to add data indicating the position and state to the measurement data. The LAN interface 65 preferably is an interface with a LAN on the ground side. The LAN interface 65 is used to receive the data indicating the position and state of the cassette containing the measurement unit 2 having time data, and the time stamp data from the system controller 56. A USB interface 66 reads data from the USB memory 8 collected from the measurement unit 2. Alternatively, the USB interface 66 reads data from, and writes data in the USB memory 8. A user interface 67 performs operation such as input of measurement instructions to the USB memory 8.

Figure 5:
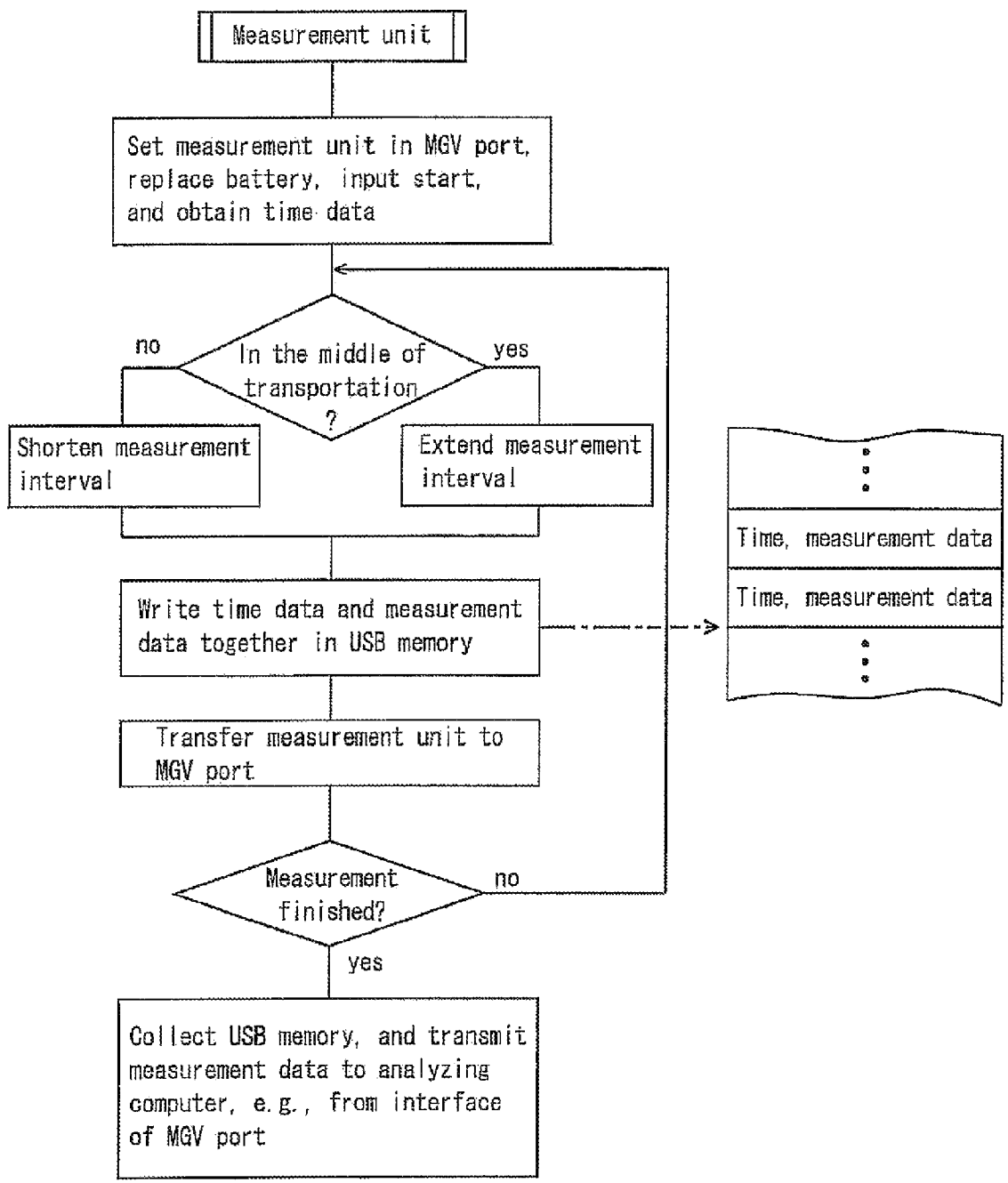
FIG. 5 is a flow chart showing processing carried out by the measurement unit according to a preferred embodiment of the present invention.

FIG. 5 shows a process in the measurement unit 2. The measurement unit 2 is set in the MGV port 36 manually by an operator, or automatically by a stacker crane or the like. The operator performs operations such as replacement of the battery pack 10, input of a starting instruction, and the measurement unit 2 obtains time data (time stamp) through the wireless LAN. Based of the time data, the time of the timer is calibrated.

When measurement is started, the measurement unit 2 obtains designated measurement data, e.g., at predetermined time intervals. The measurement data and the time data are written together in the USB memory 8. Alternatively, the measurement data and the time data are outputted to the wireless LAN or the like. The output from the vibration sensor 17 is processed by the low-pass filter 18. If acceleration that continues for one or more seconds, for example, is detected, it can be confirmed that the measurement unit 2 is being transported. If long acceleration that continues for a predetermined period or more is not detected, it can be confirmed that the measurement unit 2 is stopped. This is because, in the case of transporting the measurement unit 2, acceleration that continues for one or more seconds, for example, is applied to the measurement unit 2 by elevation, traveling, transfer or the like. In the case where the measurement unit 2 is being transported, the CPU 6 shortens the measurement interval to, every second, every five seconds or the like. In the case where the measurement unit 2 is stopped, the CPU 6 extends the measurement interval to, e.g., every 10 seconds, every minute or the like, and changes the measurement items e.g., by excluding vibrations from the measurement items. The time of the timer is calibrated using the time stamp data, and the USB interface 7 writes the time data and the measurement data together in the USB memory 8. Thus, the data of the USB memory 8 has an arrangement of a record including the time and measurement data as shown on the right side in FIG. 5.

At the time of finishing measurement, the transfer apparatus transfers the measurement unit 2 to the MGV port 36. For example, when the operator inputs an instruction to end the measurement, when the measurement end time written in the USB memory 8 comes, or when the battery low state is detected, the measurement is finished. Then, the operator removes the USB memory 8 from the measurement unit 2, and sets the USB memory 8 in the USB interface 66 of the analyzing computer 62 to read the data from the USB memory 8. In the case where the wireless LAN is available at arbitrary positions, instead of using the USB memory 8, data may be outputted through the wireless LAN.

Figure 6:
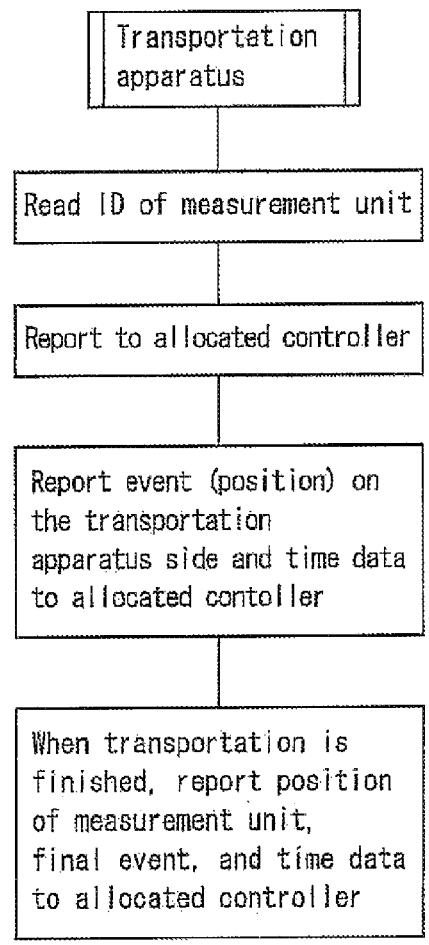
FIG. 6 is a flow chart showing processing carried out by a transportation apparatus according to a preferred embodiment of the present invention.

FIG. 6 shows processing carried out by the transportation apparatus. The transportation apparatus reads an ID of the measurement unit 2, and reports (transmits) the read ID to a controller (allocated controller) that is arranged to control the transportation apparatus. The allocated controller controls the transportation apparatus to execute a transportation instruction for the measurement unit 2. During transportation of the measurement unit 2, data such as events that have occurred on the transportation apparatus side and positions, and data indicating the times when the events occurred, are added. The transportation apparatus reports these items of data to the allocated controller. The allocated controller stores data indicating the types, positions, and times of the events. For example, data indicating the events and positions of the events include the start and end of loading, an ID of the loading station or the like. Loading is an event, the start time and end time of loading are times of the event, and the ID of the loading station is a position. Likewise, the start time and end time of traveling, and positions and the times during traveling are stored. Further, the start time of unloading, the end time of unloading, and an ID of an unloading station or the like are stored. In the cases of conventional methods also, positions and events are stored for allowing the controllers 48 to 54 to control the transportation apparatus. When transportation of the measurement unit 2 is finished, the measurement unit 2 is unloaded, e.g., to the rack 34, the MGV port 36, or the station for transfer to the next transportation apparatus. The allocated controller stores the unloaded position, the final event (unloading), and the time of the final event.

Figure 7:
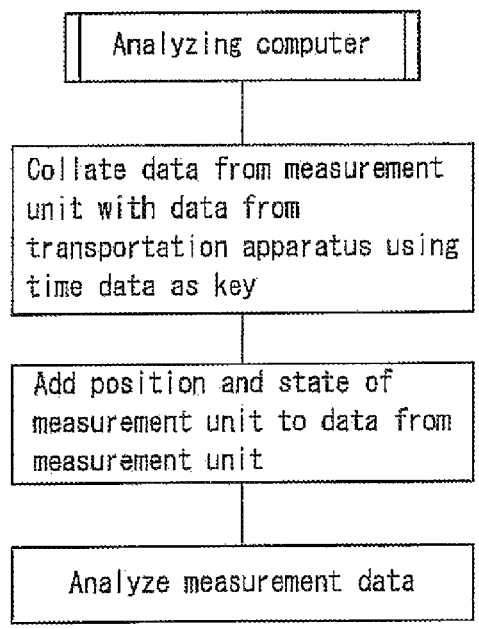
FIG. 7 is a flow chart showing processing carried out by the analyzing computer according to a preferred embodiment of the present invention.

FIG. 7 shows processing carried out by the analyzing computer 62. The collation analyzing unit 64 of the analyzing computer 62 collates data from the measurement unit 2 with data from the transportation apparatus using time data as a key. That is, the time data is added to both of the data from the measurement unit 2 and the data from the transportation apparatus. The time of these items of data is calibrated using the time stamp. Therefore, the position and the state of the measurement unit 2 when the measurement data is obtained can be estimated. Thus, data indicating the position and the state of the measurement unit 2 is added to the data from the measurement unit 2. Based on these items of data, the measurement data is analyzed. In the present preferred embodiment, the position and the state of the measurement unit 2 preferably are associated with the measurement data. The states such as "in the middle of loading", "in the middle of transportation", "in the middle of unloading", and "during storage" should be associated with the measurement data.

Figure 8:
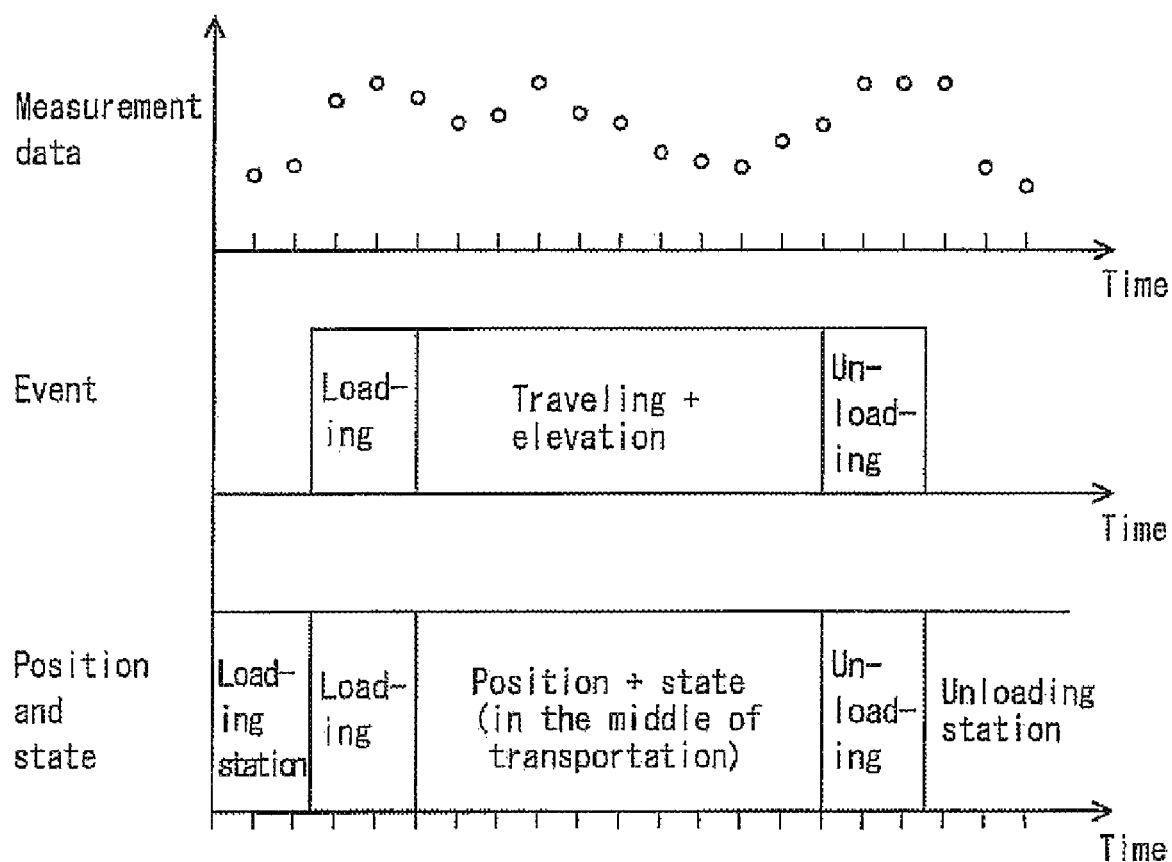
FIG. 8 is a graph schematically showing association of measurement data with the position and state of the measurement unit.

FIG. 8 shows an example of collating measurement data with data from the transportation apparatus. The lateral axis represents the time. It is assumed that the measurement data is obtained at every mark of the scale in the lateral axis. Although the measurement data includes many types of data, only one type of data is shown in FIG. 8. From the transportation apparatus, the start time and the end time of the event, and the position where the event occurred are reported together with the time data. By collating the measurement data and the events using the time data as a key, as shown on the lower side in FIG. 8, the position and the state in each time point are determined. In the case where the position of the transportation apparatus (position of the measurement unit 2) and the state of the transportation apparatus when the measurement data is obtained are not clear, and the positions before or after the time when the measurement data is obtained are known, by interpolating the positions before or after the time when the measurement data is obtained, the position of the measurement unit 2 can be estimated. Further, in general, since the transportation apparatus reports the change of the state as an event, in the case where the states at the times before and after the time when the measurement data is obtained are different, the state at the earlier time is the state of the measurement unit 2.

Operation of the present preferred embodiment will be shown. The measurement unit 2 is set to the MGV port 36 or the like. When data instructing to start measurement is inputted from the user interface 15 or the like, the measurement unit 2 starts measurement, and stores the time data and the measurement data. Then, based on a signal indicating acceleration that continues for predetermined time or more, the presence of acceleration caused by transportation is detected. Based on this data, the measurement interval is changed. The transportation apparatus picks up the measurement unit 2 in accordance with the instruction from the allocated controller, reads the ID of the measurement unit 2, and reports the ID to the allocated controller to receive a transportation instruction. Thus, the measurement unit 2 can be transported along a route where measurement needs to be performed to obtain environmental data. The transportation apparatus transports the measurement unit 2 in accordance with the transportation instruction. In the meantime, the occurrence of the event, the end time of the event, details of the event, and positions during traveling are reported to the controller of the transportation apparatus. The analyzing computer 62 receives the data of the position and state of the transportation apparatus, and the time data from the controllers 48 to 54 of the transportation apparatus or the system controller 56. The collation analyzing unit 64 collates these items of data with the measurement data having time data from the USB memory 8 of the measurement unit 2 to analyze the environmental data.

In general, the measurement unit 2 cannot directly communicate with the transportation apparatus. Therefore, the position and state of the measurement unit 2 are not known to the measurement unit 2. In a preferred embodiment of the present invention, the time of the transportation apparatus and the time of the measurement unit 2 are synchronized to use the common time data, and using the time data as a key, the position and state of the measurement unit 2 are added to the measurement data for enabling the measurement data to be analyzed. Thus, even if the existing transportation system including a transportation apparatus that cannot communicate with the measurement unit 2 is used, the environmental data for the existing transportation system can be measured easily.

In the present preferred embodiment, for example, by adding the analyzing computer 62, environmental measurement using the measurement unit 2 can be performed for the existing transportation system. In the MGV port 36 or the like, a connector for connection to the measurement unit 2 may be provided to supply the time stamp data via wired communication instead of wireless communication. In the present preferred embodiment, the cleanness, vibrations, wind speed, air temperature or the like in the clean room preferably are measured. Alternatively, for example, gas concentration and air temperature in a chemical factory may be measured.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A measurement unit to be transported by a transportation apparatus, the measurement unit comprising:
    an environment sensor arranged to measure environmental situations;
    a memory arranged to store measurement data from the environment sensor and to associate the measurement data with a state of the measurement unit; and
    a timer and a receiver unit arranged to receive a time signal to calibrate time data of the timer, the measurement data and the time data being stored together to enable the measurement data to be associated with the state of the measurement unit; wherein
    the memory is arranged to associate the measurement data with the state of the measurement unit by storing the measurement data and the time data together.

2. The measurement unit according to claim 1, wherein the memory is a detachable electronic storage medium arranged to write the measurement data in the storage medium, the measurement unit further including a terminal arranged to write data in the storage medium.

3. The measurement unit according to claim 1, wherein the environment sensor includes at least a particle counter arranged to count a number of particles, a vibration sensor, a wind speed sensor, and a microphone, the measurement unit further comprising:
    a low-pass filter arranged to process an output from the vibration sensor; and
    a controller arranged and programmed to identify whether the measurement unit is being transported or the measurement unit is stopped, based on a signal from the low-pass filter, to shorten a measurement interval when the measurement unit is being transported, and to extend the measurement interval when the measurement unit is stopped.

* * * * *